United States Patent
Horvat et al.

(10) Patent No.: US 8,216,333 B2
(45) Date of Patent: Jul. 10, 2012

(54) AIR CLEANER ASSEMBLY FOR SMALL ENGINE

(75) Inventors: Christopher Thomas Horvat, Milwaukee, WI (US); Jeffrey P. Feist, Pewaukee, WI (US); Michael Plutte, Oak Creek, WI (US)

(73) Assignee: Briggs & Stratton Corporation, Wauwatosa, WI (US)

( * ) Notice: Subject to any disclaimer, the term of this patent is extended or adjusted under 35 U.S.C. 154(b) by 444 days.

(21) Appl. No.: 12/424,453

(22) Filed: Apr. 15, 2009

(65) Prior Publication Data

US 2010/0263343 A1 Oct. 21, 2010

(51) Int. Cl.
*B01D 46/00* (2006.01)

(52) U.S. Cl. .............. 55/480; 55/493; 55/495; 55/503

(58) Field of Classification Search .......... 55/490–493, 55/385.1, 502–503, 480, 495, 497
See application file for complete search history.

(56) References Cited

U.S. PATENT DOCUMENTS

| | | | |
|---|---|---|---|
| 2,881,860 A | 4/1959 | Ternes | |
| 2,999,562 A | 9/1961 | Lechtenberg | |
| 3,039,254 A | 6/1962 | Thornburgh | |
| 3,355,863 A | 12/1967 | Pittsley | |
| 3,413,780 A | 12/1968 | Amlott et al. | |
| 3,796,027 A | 3/1974 | Gumtow | |
| 3,925,972 A * | 12/1975 | Andersson | 56/320.2 |
| 4,396,407 A | 8/1983 | Reese | |
| 4,425,145 A | 1/1984 | Reese | |
| 4,552,574 A | 11/1985 | Hotta | |
| 4,925,468 A * | 5/1990 | Kishi et al. | 55/467 |
| 4,925,469 A * | 5/1990 | Clement et al. | 55/480 |
| 5,059,221 A | 10/1991 | McWilliam | |
| 6,612,275 B2 | 9/2003 | Immel et al. | |
| 6,783,579 B2 | 8/2004 | Pettipiece | |
| 7,007,660 B2 | 3/2006 | Taomo et al. | |
| 7,025,034 B2 | 4/2006 | Warfel et al. | |
| 7,107,963 B2 | 9/2006 | Warfel et al. | |
| 7,282,077 B2 | 10/2007 | Honisch et al. | |
| 7,285,148 B2 | 10/2007 | Daleiden | |
| 7,314,397 B2 | 1/2008 | Sodemann et al. | |
| 7,441,532 B2 | 10/2008 | Disch et al. | |
| 7,459,004 B2 | 12/2008 | Miyake et al. | |
| 7,473,292 B2 | 1/2009 | Moriyama et al. | |
| 2002/0088214 A1 | 7/2002 | Sherwood | |
| 2005/0229561 A1* | 10/2005 | Nepsund et al. | 55/481 |
| 2006/0064955 A1 | 3/2006 | Shimomura | |
| 2006/0080949 A1* | 4/2006 | Moriyama et al. | 55/490 |
| 2006/0288672 A1 | 12/2006 | Miyake et al. | |
| 2007/0186894 A1 | 8/2007 | Disch et al. | |
| 2008/0314357 A1* | 12/2008 | Sasano et al. | 123/198 E |

* cited by examiner

*Primary Examiner* — Duane Smith
*Assistant Examiner* — Karla Hawkins
(74) *Attorney, Agent, or Firm* — Foley & Lardner LLP

(57) ABSTRACT

An exemplary embodiment of the invention relates to an air cleaner assembly for a small multi-purpose, combustion engine as may be used for mechanically powering pressure washers, lawn mowers, go-carts, electric power generators, and the like. In some embodiments, the air cleaner assembly includes a casing having an air inlet and an air outlet, and the casing is designed to pivot open to allow a user to access the casing interior. In the casing interior, a filter support is designed to hold an air filter between the air inlet and air outlet. In certain embodiments, the air cleaner assembly also includes a hinge that is integrally formed with the casing. A releasable fastener is designed to hold the casing closed.

24 Claims, 4 Drawing Sheets

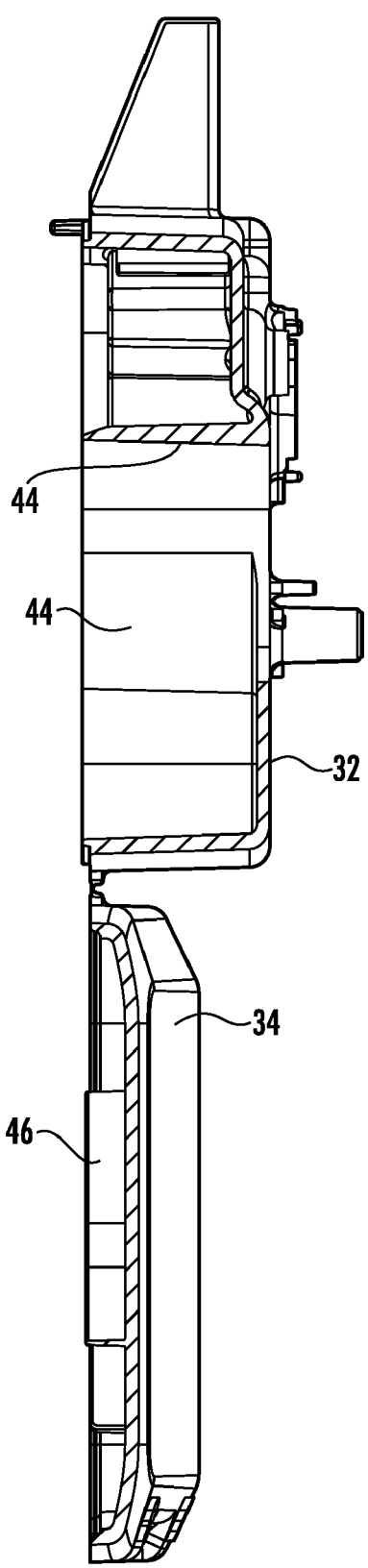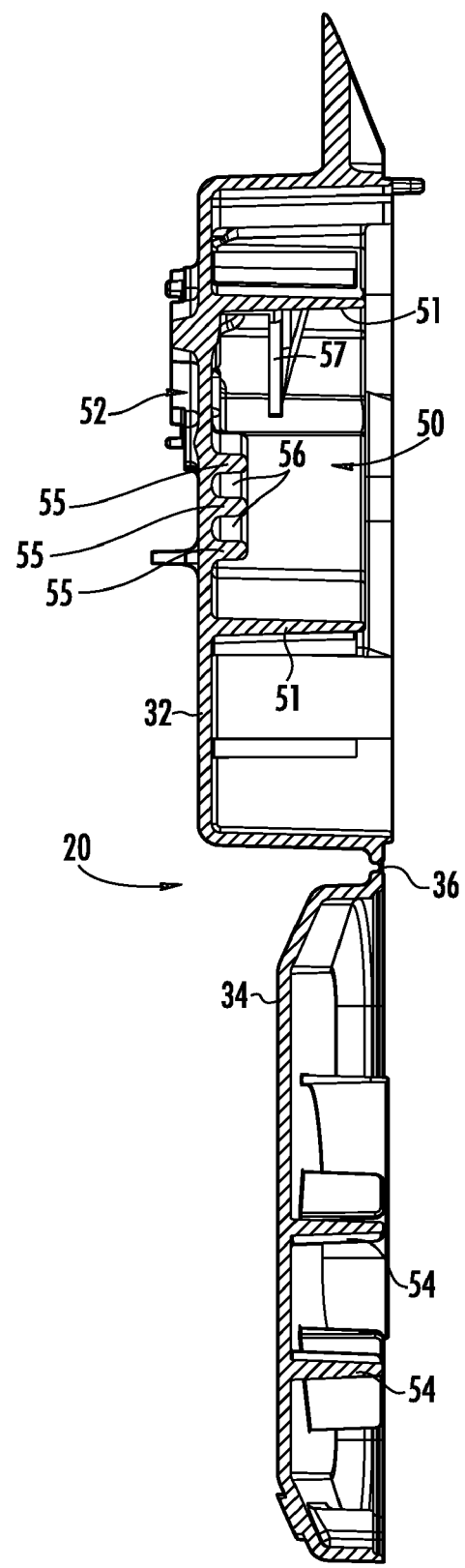

AIR CLEANER ASSEMBLY FOR SMALL ENGINE

BACKGROUND

The present invention relates generally to the field of combustion engine air cleaner assemblies. More specifically, the invention relates to air cleaner assemblies configured for use with air filters for small, multi-purpose, internal combustion engines, as may be used for mechanically powering pressure washers, lawn mowers, go-carts, electric power generators, and the like.

Air cleaners deliver outside air into a combustion engine and recirculate air with unspent fuel from an engine crankcase into an engine combustion chamber. After passing through an air cleaner, but before or upon entering the combustion chamber, the air is mixed with fuel, such as in a carburetor or with a fuel injector.

However, dirt, dust, water particles and other contaminants held in the outside air may enter an engine through an air cleaner, harming the efficiency of the engine. For example, dirt may increase friction between a piston and a cylinder combustion chamber. Also, dirt may block or constrict air and/or fuel flow within internal channels of an engine. As such, air cleaners typically include air filters, which help remove dirt, dust, water particles and other contaminant particles from the air prior to the air entering a carburetor or other engine components.

Over time, the dirt, dust, and other contaminants collected on a filter build up, clogging the filter and restricting air flow. Reduced air flow harms engine efficiency, so air cleaners are typically designed to allow the air filter to be replaced from time to time.

SUMMARY

One embodiment of the invention relates to an air cleaner assembly for a small engine. The air cleaner assembly includes a casing having an air inlet and an air outlet. The casing is designed to pivot open to allow a user to access the casing interior. In the casing interior, a filter support is designed to hold an air filter between the air inlet and air outlet. The air cleaner assembly also includes a hinge that is integrally formed with the casing. A releasable fastener is designed to hold the casing closed.

Another embodiment of the invention relates to an air cleaner assembly for a small multi-purpose, combustion engine. The air cleaner includes a casing, and the casing includes a body, a cover, an air inlet, and an air outlet. A releasable fastener is designed to hold the casing closed. While the casing is closed, the air cleaner assembly further includes an intake duct that is integrally formed with the casing, where the duct is formed from a joining of the body and the cover. A filter support is formed in the casing interior, and is designed to hold an air filter between the air inlet and the air outlet.

Yet another embodiment of the invention relates to an air cleaner assembly for an engine. The air cleaner assembly includes a casing that has a body, a cover, an air inlet, and an air outlet. The air inlet and the air outlet are substantially on a same side of the casing. Also, the air cleaner assembly includes a slide lock designed to hold the casing closed, and remain attached to the casing when the casing is either open or closed. A filter support is formed in the casing interior, and is designed to hold an air filter between the air inlet and the air outlet.

Alternative exemplary embodiments relate to other features and combinations of features as may be generally recited in the claims.

BRIEF DESCRIPTION OF THE FIGURES

The disclosure will become more fully understood from the following detailed description, taken in conjunction with the accompanying figures, wherein like reference numerals refer to like elements, in which:

FIG. 4 is a cross-section of the air cleaner of FIG. 3 taken along line 4-4 showing an inlet tube and other components according to an exemplary embodiment.

FIG. 5 is a cross-section of the air cleaner of FIG. 4 taken along line 5-5 showing a filter support and other components according to an exemplary embodiment.

DETAILED DESCRIPTION OF THE EXEMPLARY EMBODIMENTS

Figure 1:
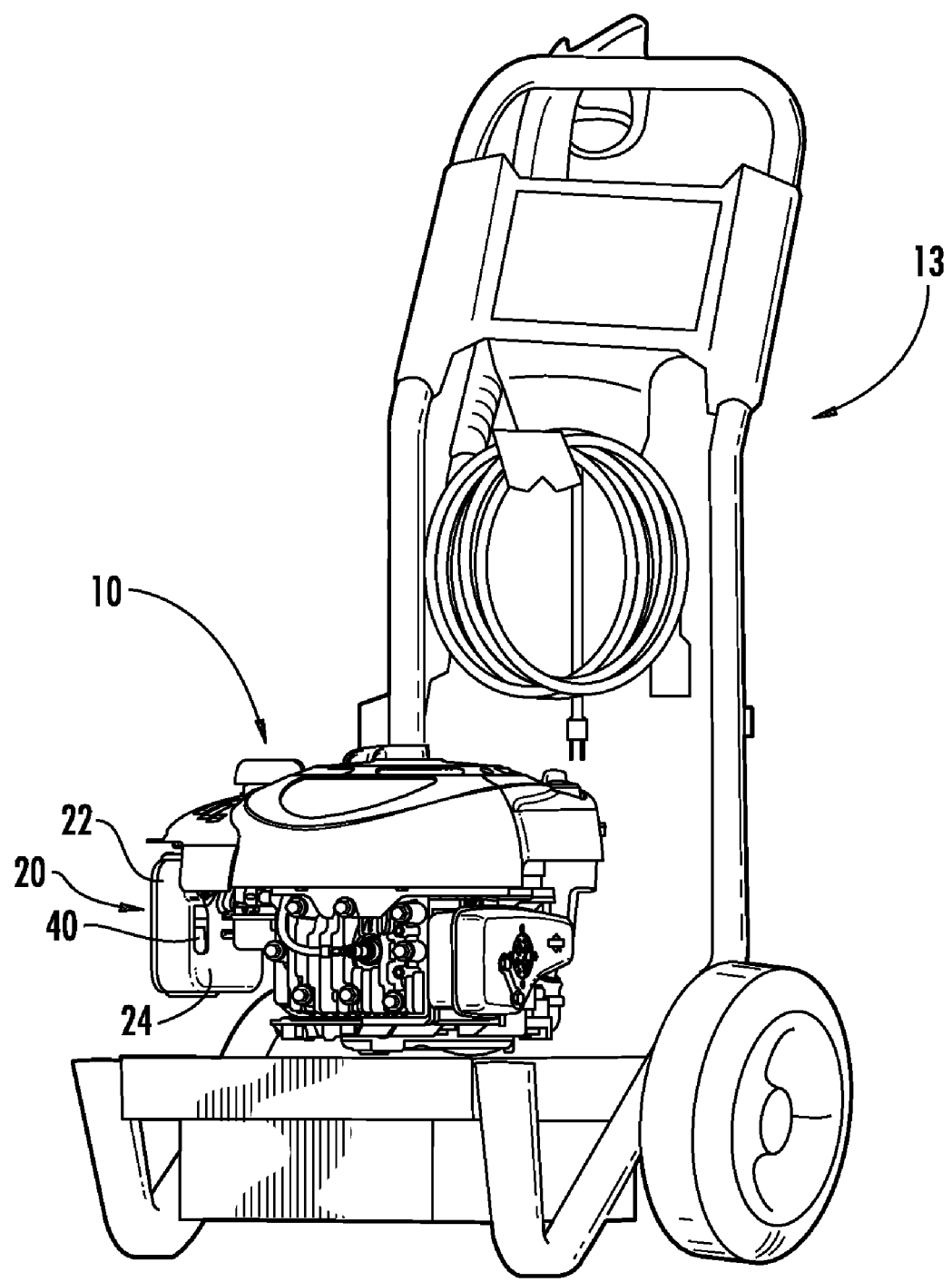
FIG. 1 is a perspective view of a portable pressure washer with a combustion engine having an air cleaner assembly according to an exemplary embodiment.
Figure 2:
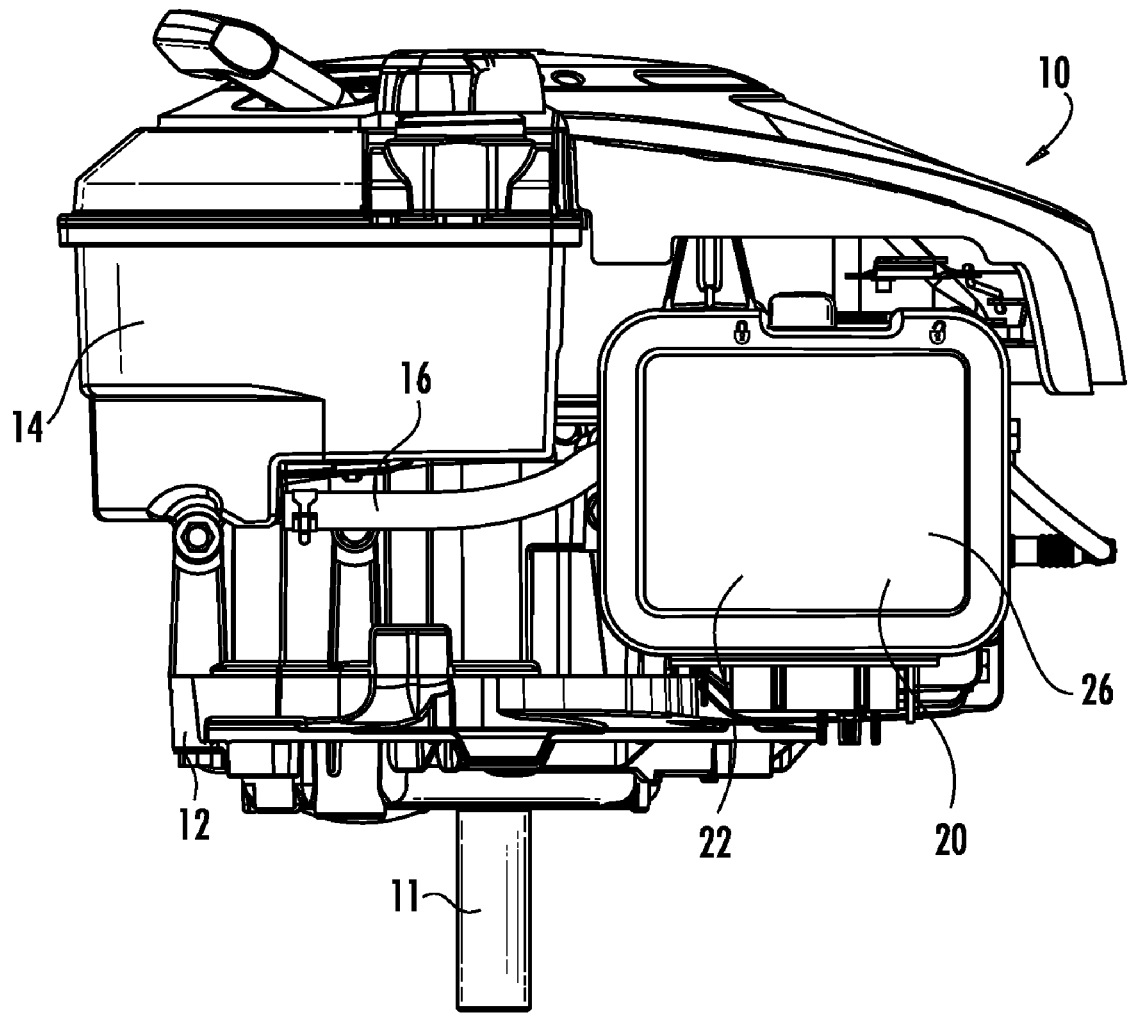
FIG. 2 is a side view of a combustion engine according to an exemplary embodiment.

Referring to FIGS. 1-2, an internal combustion engine 10 with a vertical crankshaft 11 is shown according to an exemplary embodiment. FIG. 1 shows the engine 10 as part of a portable pressure washer 13 embodiment. The combustion engine 10 further comprises a crankcase 12, a fuel tank 14 with a fuel line 16, and other such features and components that may be for use with internal combustion engines, such as a starting lever for a pull cord, a throttle, an engine cover, an exhaust, and a fuel cap. Other embodiments include engines of different configurations, such as engines with horizontal crankshafts. As such, the engine 10 may be configured to power a pump, such as a centrifugal pump. In other embodiments, the engine 10 may power a lawn mower blade, a compressor, a fan, a drive shaft attached to a vehicle or a cart (e.g., for a go-cart), an electric power generator, and the like.

The engine 10 as shown in the FIGS. 1-2 also includes an air cleaner 20, which itself includes a casing 22, housing, shell, box, container, or other like structure. Air passes through an inlet 40 and into the air cleaner 20 and is directed to an internal combustion chamber that may be formed from a cylinder and a piston, a plurality of pistons, a cylinder head, a valve, a plurality of valves and the like. After being drawn through the air cleaner 20, the air is mixed with a fuel (e.g., gasoline, diesel, ethanol, alcohol, and the like) in a carburetor, for example. However, in other embodiments the air does not enter a carburetor, but instead is mixed with fuel via a fuel injector or other like system.

The air flow rate through an air cleaner may be in part governed by a controller, such as a computer, with a processor, memory, and/or stored instructions. For example, the controller may activate a super- or turbo-charger compressor fan, based upon the stored instructions (e.g., a logic module), to draw an increased air flow through the air cleaner. Such a controller may also operate other features and components of an engine, such as a timing of valves in a combustion chamber, and the like.

FIG. 2 shows the engine 10, rotated approximately 135-degrees about the crankshaft 11 from the a perspective view of the engine 10. FIG. 2 shows the front face of the air cleaner 20, while FIG. 1 shows a portion of the back side 24 or engine side of the air cleaner casing 22. The casing 22 forms an opening 40 or inlet on the back side 24, which is also the side where air passes out of the air cleaner 20 and into the rest of the engine 10. In other embodiments, an opening or openings can be formed in a different location on the back side 24 or in other parts of the casing 22, such as on the front side 26, on side walls of the casing, and/or combinations, such as an opening extending from the side wall to the front side 26. However, forming the opening 40 on the back side 24 may be preferred in order to reduce an intake of air that is higher in particle contaminants, especially in applications where there may generally be a greater concentration of particle contaminants in air proximate to the front side 26 of the air cleaner 20.

Figure 3:
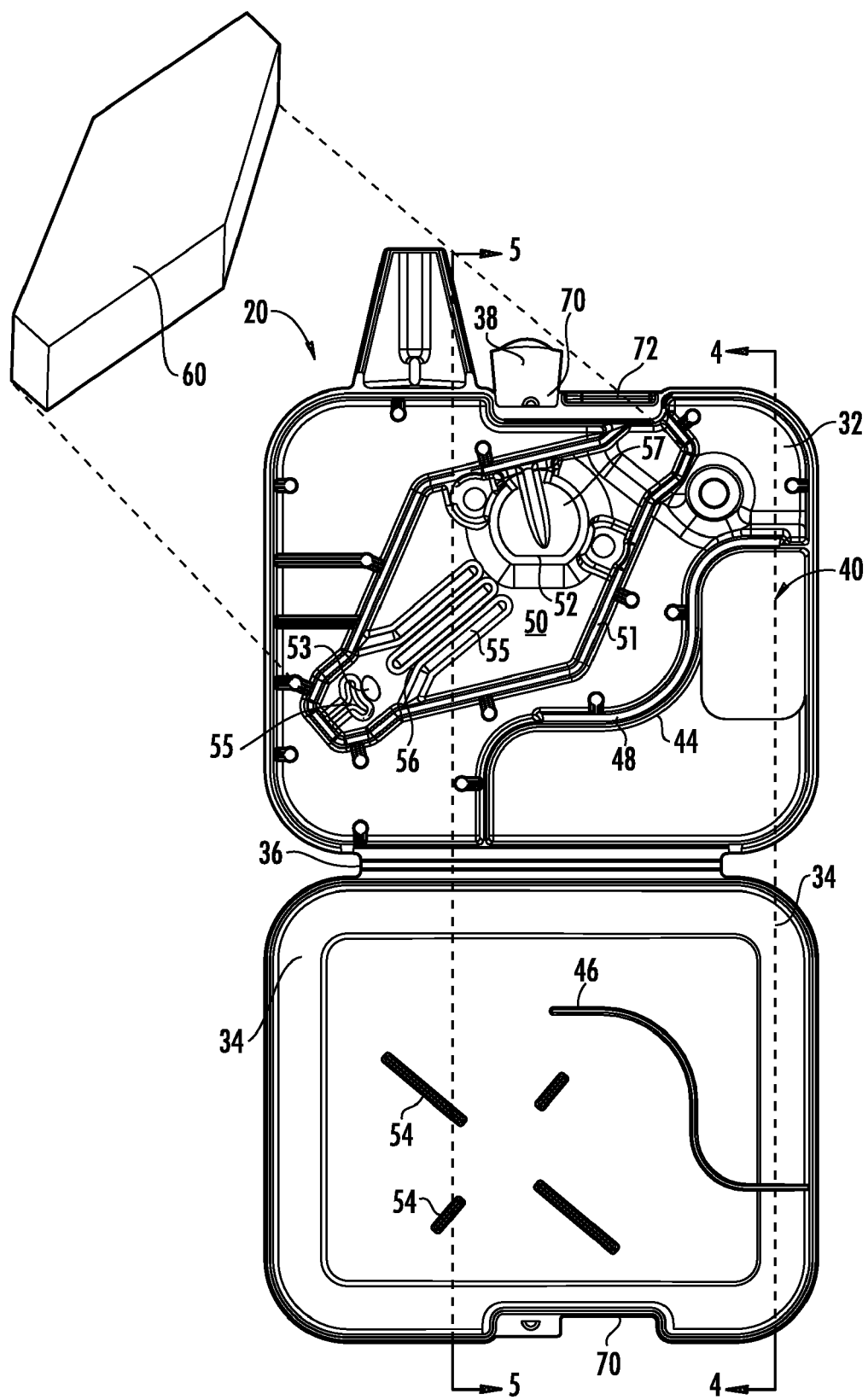
FIG. 3 is a top-down view of an air cleaner and a filter for a combustion engine according to an exemplary embodiment.

Referring now to FIGS. 3-5, the air cleaner 20 is shown according to an exemplary embodiment. FIG. 3 shows the air cleaner 20 in an open position, wherein the air cleaner assembly includes an air filter 60 and the casing 22 that may hold the air filter 60. The air filter 60 is configured to be received in a filter support 50 (e.g., bed, holder, slot, frame, etc.), which is disposed within a flow path of the air through the casing 22. The filter support 50 may be integrally formed with the casing 22. Additionally, the casing 22 may include a clam-shell type body having a main body 32 and a cover 34. The clam-shell type body of the air cleaner casing 22 may be closed by folding the sides together into a closed position. Such folding may be facilitated by incorporating a hinge or a fold between the sides.

In at least one embodiment, the main body 32 and the cover 34 are integrally formed as a single casing 22, and joined with a hinge 36 that allows the cover 34 to be pivoted relative to the main body 32. The hinge 36 may be a living hinge, such as a relatively thin piece or strip of continuous plastic or metal material that is flexible and joins two more rigid parts, such as the main body 32 and the cover 34. The body 32, the cover 34, and the living hinge 36 may be integrally formed via a plastic injection molding process, for example. The living hinge 36 forms a better seal along the side of the casing 22 than other types of hinges that are not continuous. The living hinge 36 is also easier to clean.

While in a preferred embodiment the main body 32 and the cover 34 are coupled together with a living hinge 36 and are molded as a single integral body, according to other exemplary embodiments the main body 32 and the cover 34 may be formed separately and coupled together with a separately formed hinge. According to still other exemplary embodiments, the main body 32 and the cover 34 may be formed separately and include interlocking portions that couple the main body 32 and the cover 34 and may function as a hinge. Other embodiments within the scope of the invention include no hinge and instead allow for the cover and body to be completely separated upon opening.

According to some exemplary embodiments, the casing 22 is a plastic casing, for example, formed from a plastic polymer (e.g., polypropylene or polyethylene) via an injection molding process. Polypropylene is a relatively inexpensive material that is resistant to heat, many solvents, acids, bases and to corrosion; unlike some metals, such as steel, which may rust over time. Further, a polymer such as polypropylene may be colored in a variety of colors to match or coordinate with the other components of the engine 10, without the need for paint. Other embodiments include casings formed from metals, such as aluminum, aluminum alloys, steel, stainless steel, and other metals. Such metal casings may be formed from stamping and/or pressing metal sheet, welding together components, and the like. Still other embodiments are formed from a composite of materials, such as a polyethylene cover and main body joined with a brass hinge attached via mechanical or chemical fasteners.

Referring to FIG. 3, a slide lock 38 may be used as a closure or locking member for the air cleaner 20. In the unlocked or open position of the slide lock 38, the cover 34 may be lifted, pivoted, and/or rotated relative to the main body 32, allowing a user to access the interior of the air cleaner 20. In the locked or closed position of the slide lock 38, the cover 34 is substantially fixed relative to the main body 32.

Further referring to FIG. 3, the slide lock 38 is coupled to the main body 32 or the cover 34 (or both) of the casing 22. According to an exemplary embodiment, the casing includes slide rails 72 (e.g., projections, flanges, ledges, etc.) provided in a depression or recessed area 70 on the casing 22. The slide rails 72, on both the main body 32 and the cover 34, may be outwardly projecting bodies that are aligned when the casing 22 is in a closed position, such that the rails 72 are received in a T-shaped slot in the slide lock 38, for example. When the slide lock 38 is moved over the slide rails 72, such that the rails 72 are received within the slot, the main body 32 and the cover 34 are held together by the structure of the slide lock 38. However, to open the casing 22, a user may slide the slide lock 38 to disengage the slide lock 38 from the slide rails 72, freeing the cover 34 to be pivoted relative to the main body 32 along the living hinge 36. The slide lock 38 is shown in the FIGURES on a side of the casing 22 opposite to the living hinge 36. However, according to other exemplary embodiments, the slide lock 38 or a plurality of slide locks (or other releasable fasters and locking mechanisms) may be provided on another side or sides of the casing 22; such as two slide locks, each on a side adjacent to the living hinge 36.

The slide lock 38 provides for a tool-less holding member or releasable fastener that allows a user to unlock and open the casing 22 by hand, without requiring the user to employ additional tools, such as screwdrivers, pliers, and the like. However, while the locking mechanism is shown in the FIGURES as a slide lock 38, according to other exemplary embodiments, a wide variety of other components may be used to selectively close, hold, or lock the casing 22 in a closed position. For example, the main body 32 and the cover 34 may include a plurality of releasable fasteners such as latches, buckles, clips, snaps, butterfly nuts, buttons, and the like.

According to still other embodiments, other suitable fastening members and/or locking mechanisms, which may or may not be tool-less may be used to couple the cover 34 to the main body 32, such as pins, keys, threaded screws, and the like. For example, in another embodiment an air cleaner includes a removable cover that is coupled to the base by a plurality of hex-head screws. Other embodiment casings may comprise a catch and slot hinge, allowing the cover to be removed completely during maintenance of the air filter.

Referring now to FIGS. 3-5, air enters the air cleaner 20 through an inlet 40 and is directed to the air filter 60 by channels within the air cleaner 20. The embodiment shown in FIGS. 3-5 includes an integrally-molded air duct, pipe, or tube. The duct is formed from a first portion 44 extending from the main body 32 and a second portion 46 extending from the cover 34. In some exemplary embodiments, the first portion 44 and the second portion 46 include similarly contoured walls that may define the duct, a pipe, a tube, a passage, a channel, an air guide, and the like, when the casing 22 is in a closed position. For example, the first portion 44 includes a groove 48 (e.g., furrow, slot, gap, etc.) that may receive the edge of the second portion 46 or visa versa, to form a seal between the first portion 44 and the second portion 46 when the cover 34 is in a closed position. The configuration of the air cleaner shown in FIG. 3 is intended to provide for engine noise reduction. Sound is not easily transmitted through walls of the air cleaner 20, and instead primarily escapes via the air duct. The configuration of the duct in the embodiment of FIG. 3 provides an acoustic impedance mismatch that results in reflection of sound back to the source rather than being transmitted outside the engine, reducing noise output from the engine.

The air filter 60 may be formed from paper materials, foam materials, fibrous layers or mats, wire meshes, or other suitable filtering media. While the air filter 60 is shown as generally diamond-shaped in FIG. 3, according to other exemplary embodiments, the air filter 60 may be shaped differently to accommodate a different engine 10 or air cleaner 20 geometry (e.g., square, rectangular, oval, circular, etc.). Additionally, the filter 60 may function as a "silencer" or noise muffler to reduce the escape of engine noise from the air cleaner 20, and to dampen sound waves passing through the air cleaner 20.

Referring to FIGS. 3-5, the air filter 60 may be received by the casing 22 in a filter support 50 such as a frame, a holder, a cradle, a support structure, a housing, etc, located in the flow path between the inlet 40 and the outlet 52. According to an exemplary embodiment, the filter support 50 is defined by walls 51. In some exemplary embodiments, the filter support 50 may be generally shaped to match the shape of the air filter 60 housed in the casing 22. In certain embodiments, a foam air filter may be wider than the corresponding filter support, requiring the foam filter to be squeezed into the filter support for a tight fit. The walls 51 may be integrally molded with the main body 32 and the cover 34; or the walls 51 may be separately attachable. The air filter 60 may sit between or within the walls 51, and adjacent to, proximate to, or in the path of air flowing to an air outlet 52.

A plurality of ridges 54, guides, or protrusions may be provided on the cover 34, positioned opposite to the filter support 50. The ridges 54 may help to hold or fix an air filter within the support 50. Other ridges 55 may be provided proximate to the outlet 52 on the main body 32 to form passages 56 to channel air from a breather 53 inlet to the outlet 52. For example, air from the breather 53 may be recycled air from the crankcase. Such recycled air may contain oil or fuel vapor. This recycled air may pass under the filter 60 through the ridges 55 and out through the outlet 52 of the air cleaner 20. In some exemplary embodiments, the ridges 54, 55 are integrally molded with the main body 32 or the cover 34.

As shown in the FIGS. 3-5 embodiments, the air cleaner 20 may further include a spit back shield 57. The spit back shield 57 may serve as a barrier between the air filter 60 and a carburetor. For example, the spit back shield 57 may intercept droplets of fuel that may exit from the carburetor. In some exemplary embodiments, the spit back shield 57 may be integrally molded with the casing 22. By molding the breather passages 56 and the spit back shield 57 integrally with the casing 22, the need for separate parts, such as stamped metal parts, may be reduced or eliminated, and the total number of parts to manufacture an air cleaner may be reduced.

While the casing 22 is shown with an integrally formed inlet duct formed from the joining of the portions 44, 46, a similar technique may be used to form a plurality of tubes or passages within or extending from the casing 22. For example, according to other exemplary embodiments, the location of the air filter 60, the inlet 40 and the outlet 52 relative to each other may differ. In some exemplary embodiments, the casing 22 may include an integrally formed passage between the inlet 40 and an intermediate interior chamber or between the air filter 60 and the outlet 52. Additional integrally-formed tubes and other pieces may extend from the exterior of the air cleaner 20, such as ducts, tubes, and pipes to the breather, carburetor, combustion chamber, and support structure that may hold the air cleaner 20 onto the engine 10.

As utilized herein, the terms "approximately," "about," "proximate," "substantially," and similar terms are intended to have a broad meaning in harmony with the common and accepted usage by those of ordinary skill in the art to which the subject matter of this disclosure pertains. These terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the accompanying drawings. The orientation of various elements may differ according to other exemplary embodiments, and such variations are intended to be encompassed by the present disclosure.

The construction and arrangement of the air cleaner assembly for a small multi-purpose, combustion engine as shown in the various exemplary embodiments is illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. An air cleaner assembly for an internal combustion engine, comprising:
   a casing having an air inlet and an air outlet, a body, and a cover, wherein the casing is configured to pivotally open to allow a user to access an interior of the casing;
   a releasable fastener configured to hold the casing in a closed position;
   a filter support in the interior, wherein the support is configured to hold an air filter between the air inlet and the air outlet; and
   a hinge integrally formed with the body and cover of the casing such that the hinge, the body, and the cover are a continuous piece of material.

2. The air cleaner assembly of claim 1, wherein the casing is plastic.

3. The air cleaner assembly of claim 2, wherein the hinge comprises a continuous piece of flexible plastic integral with the casing that bends to open or close the cover.

4. The air cleaner assembly of claim 3, further comprising a spit back shield proximate to the air outlet, wherein the spit back shield is integrally formed with the casing.

5. The air cleaner assembly of claim 4, wherein the releasable fastener remains coupled to the casing when the casing is both in an open position and in the closed position.

6. The air cleaner assembly of claim 5, wherein the releasable fastener comprises a slide lock.

7. The air cleaner assembly of claim 6, wherein the air inlet and the air outlet are on a same side of the casing.

8. The air cleaner assembly of claim 7, further comprising an air duct integrally formed from a joining of the body and the cover when the casing is in the closed position.

9. An air cleaner assembly for an internal combustion engine, comprising:
   a casing including a body, a cover, an air inlet, and an air outlet;
   a releasable fastener configured to fasten the cover to the body in a closed position;
   an air duct integrally formed from the cover and the body via a joining of a first portion integrally extending from the body and a second portion integrally extending from the cover when the casing is in the closed position, wherein the first portion and the second portion form a seal when joined, and wherein the air duct forms a passage within an interior of the casing when the casing is in the closed position; and
   a filter support in a chamber in the interior of the casing to which the passage directs air from the air inlet when the casing is in the closed position, wherein the filter support is configured to hold an air filter between the air inlet and the air outlet.

10. The air cleaner assembly of claim 9, further comprising a hinge integrally formed with the casing, wherein the cover is configured to pivotally open relative to the body to allow a user to access the interior of the casing.

11. The air cleaner assembly of claim 10, wherein the releasable fastener remains coupled to the casing when the casing is both in an open position and in the closed position.

12. The air cleaner assembly of claim 11, wherein the releasable fastener comprises a slide lock.

13. The air cleaner assembly of claim 12, wherein the casing is plastic.

14. The air cleaner assembly of claim 13, wherein the air inlet and the air outlet are on a same side of the casing.

15. The air cleaner assembly of claim 14, further comprising a spit back shield proximate to the air outlet, wherein the spit back shield is integrally formed with the casing.

16. An air cleaner assembly for an engine, comprising:
   a casing having a body, a cover, an air inlet, and an air outlet, wherein the air inlet and the air outlet are on a same side of the casing;
   a filter support in an interior of the casing, wherein the support is configured to hold an air filter between the air inlet and the air outlet; and
   a slide lock configured to hold the casing in a closed position, the slide lock being a movable member, wherein the slide lock remains coupled to the casing when the casing is both in an open position and in the closed position.

17. The air cleaner assembly of claim 16, further comprising a hinge integrally formed with the casing, wherein the cover is configured to pivotally open relative to the body to allow a user to access the interior of the casing.

18. The air cleaner assembly of claim 17, wherein the casing is plastic.

19. The air cleaner assembly of claim 18, further comprising an air duct integrally formed from a joining of the body and the cover when the casing is in the closed position.

20. The air cleaner assembly of claim 19, further comprising a spit back shield proximate to the air outlet, wherein the spit back shield is integrally formed with the casing.

21. The air cleaner assembly of claim 9, wherein one of the first and second portions includes a groove configured to receive an edge of the other of the first and second portions such that the groove and the edge together form a seal between the first and second portions when the cover is in the closed position.

22. The air cleaner assembly of claim 9, wherein the passage of the air duct includes a ninety degree bend.

23. The air cleaner assembly of claim 22, wherein the air duct is configured to provide an acoustic impedance mismatch to reduce noise output of the internal combustion engine.

24. The air cleaner assembly of claim 16, wherein the body and the cover of the casing include slide rails that align with one another when the casing is in the closed position, and wherein the slide lock includes a slot configured to receive the slide rails when the slide lock is engaged in order to lock the casing in the closed position.

* * * * *